(12) United States Patent
Guo et al.

(10) Patent No.: US 8,542,914 B2
(45) Date of Patent: Sep. 24, 2013

(54) FILM SCANNING METHOD

(75) Inventors: Xian-Qiang Guo, Suzhou (CN); Chien-Hsing Tang, Suzhou (CN)

(73) Assignee: Qisda (Suzhou) Co., Ltd, Suzhou, Jiangsu Province (CN)

( * ) Notice: Subject to any disclaimer, the term of this patent is extended or adjusted under 35 U.S.C. 154(b) by 240 days.

(21) Appl. No.: 12/890,670

(22) Filed: Sep. 26, 2010

(65) Prior Publication Data

US 2011/0075925 A1 Mar. 31, 2011

(30) Foreign Application Priority Data

Sep. 28, 2009 (CN) .......................... 2009 1 0205136

(51) Int. Cl.
*G06K 9/00* (2006.01)
*H04N 1/23* (2006.01)

(52) U.S. Cl.
USPC ........................ 382/162; 382/168; 358/302

(58) Field of Classification Search
None
See application file for complete search history.

(56) References Cited

U.S. PATENT DOCUMENTS

| | | | | | |
|---|---|---|---|---|---|
| 4,891,692 | A | * | 1/1990 | Outa | 358/506 |
| 4,974,068 | A | * | 11/1990 | Hiramatsu et al. | 358/506 |
| 5,017,014 | A | * | 5/1991 | Terashita | 356/404 |
| 5,412,737 | A | * | 5/1995 | Govrin | 382/168 |
| 5,541,645 | A | * | 7/1996 | Davis | 348/96 |
| 6,037,109 | A | * | 3/2000 | Fuessel et al. | 430/359 |
| 6,665,434 | B1 | * | 12/2003 | Yamaguchi | 382/162 |
| 7,057,195 | B2 | | 6/2006 | Cai | |
| 7,388,698 | B2 | | 6/2008 | Kim | |
| 2002/0085099 | A1 | * | 7/2002 | Hirasawa et al. | 348/222 |
| 2003/0035149 | A1 | * | 2/2003 | Ishikawa et al. | 358/302 |
| 2003/0231351 | A1 | * | 12/2003 | Schindler et al. | 358/302 |
| 2008/0077858 | A1 | * | 3/2008 | Asakawa et al. | 715/255 |

FOREIGN PATENT DOCUMENTS

| | | |
|---|---|---|
| CN | 2634750 | 8/2004 |
| CN | 1567345 A | 1/2005 |
| JP | 2002341461 A | 11/2002 |

OTHER PUBLICATIONS

Office Action of Counterpart application by China Patent Office on Jun. 7, 2011.

* cited by examiner

*Primary Examiner* — Barry Drennan
*Assistant Examiner* — Feng Niu

(57) ABSTRACT

A film scanning method is provided. When the film is judged as a negative film, the scanning device sets the scan exposure time for the film according to the base background color of the film. The negative film is scanned for the scan exposure time, wherein, the film passes through the scanning device at one time so as to complete the above judge of the film type and scanning of the film. The film scanning method automatically completes the recognition of film type, performs accurate scanning based on the scan exposure time, expands the dynamic range and reduces noise impacts, so as to obtain a scanned image with higher accuracy.

10 Claims, 3 Drawing Sheets

FILM SCANNING METHOD

This application claims the benefit of People's Republic of China application Serial No. 200910205136.5, filed Sep. 28, 2009, the subject matter of which is incorporated herein by reference.

BACKGROUND OF THE INVENTION

1. Field of the Invention

The invention relates in general to a film scanning technology, and more particularly to a film scanning method capable of scanning and recognizing a film to obtain a clear film scan image through a single scanning.

2. Description of the Related Art

The film scanner is currently directed towards the integration of many film scanning functions, such as reading the positive film (the reversal film or the slide film) as well as the negative film (the black/white film and the color film). High accuracy in color recovery is expected on the film scanner. Since the film itself carries a base background color, manual color correction is needed during scanning. Films from different manufacturers usually have different base background colors and negatives have large tolerance in exposure (for example negatives have tolerance in twice exposure). Therefore, during negative scanning, scanning calibration cannot be performed through the use of standard color sheet which is applicable in the scanning of an ordinary photo. Before scanning a film by the prior scanning device, manual adjustment on the film is needed. Examples of manual adjustment include color calibration (change in the hue of color), exposure calibration (brightness level) and color saturation processing on pre-scanned pictures. Thus, this kind of the film scanner needs to repeatedly scan the film for many times, and complete film adjustment and calibration function manually. However, there is difference in accuracy between manual color calibration result and the optimum color of the film itself. Meanwhile, aberration even exists in the films of the same model from the same manufacturer. Therefore, accurate recovery of film scanning cannot be implemented just through the recognition of the manufacturers and the film type.

SUMMARY OF THE INVENTION

The invention is directed to a film scanning method capable of automatically completing the recognition of film type and correcting the scan image. According to the film scanning method, the recognition of film type is completed when the film passes through the scanning device at one time; and accurate scanning, scan exposure adjustment and automatic marking are performed according to the result of recognition, for obtaining the scan image with higher accuracy.

A film scanning method is provided, wherein the film scanning method includes: setting a scan exposure time for a film by a scanning device according to a base background color of the film if the film is judged as a negative film; setting a boundary marking threshold based on the base background color of the film by the scanning device, wherein the boundary marking threshold is a demarcation value separating a foreground point from a background point during scanning; and scanning the negative film for the scan exposure time; wherein the film passes through the scanning device at one time so that the scanning device judges and scans the film.

To be more specifically, the film scanning method further includes: scanning the film entering the scanning device by the scanning device so as to obtain individual RGB averages of the base of the film, wherein the scanning device judges the film according to the individual RGB averages of the base of the film.

In an implementation, the film scanning method further includes: judging a type of the film as one of a positive film, a black/white negative film and a color negative film by the scanning device according to the individual RGB averages of the base of the film.

In another implementation, the film scanning method further includes: after the film is inserted into the scanning device, activating the scanning device in a positive film mode for analyzing image data on two base sides of the film to obtain the base background color of the film so as to judge the film.

In yet another implementation, the film scanning method further includes: setting the base background color of the film as the individual RGB averages of the base of the film; and setting subsequent scan exposure time by the scanning device according to the judged type of the film and the individual RGB averages of the base of the film under a current exposure condition so as to calculate the individual RGB averages of the base of the film for subsequent scanning and set the individual RGB averages of the base of the film for subsequent scanning as a boundary marking threshold for performing automatic marking.

A film scanning method is provided, including: after a film enters a scanning device, reading image data of a base of the film by the scanning device to obtain individual RGB averages of the base of the film; judging a type of the film as one of a positive film, a black/white negative film and a color negative film by the scanning device according to the individual RGB averages of the base of the film; if the type of the film is judged as the black/white negative film or the color negative film, setting a scan exposure time for subsequent scanning by the scanning device according to the judged type of the film and the individual RGB averages of the base of the film under a current exposure condition; calculating the individual RGB averages of the base of the film for subsequent scanning by the scanning device according to the judged type of the film and current individual RGB averages, or obtaining the individual RGB averages by scanning the base for the set scan exposure time, and setting a boundary marking threshold based on the individual RGB averages for performing automatic marking on the film; and scanning the film by the scanning device under the above conditions to obtain scanned data of the film.

The step of setting the scan exposure time for subsequent scanning includes: setting the individual RGB averages of a base of another negative film for subsequent scanning in advance and comparing with the individual RGB averages of the type-judged film by a predetermined scan exposure time so as to calculate the subsequent scan exposure time for the film.

In the abovementioned scanning method, after the film enters the scanning device, the film passes through the scanning device at one time for completing the judge of the film type, the film scanning and automatic marking program so as to obtain image data of the scanned film.

In another implementation, the scanning method further includes: if the film is judged as the black/white negative film, setting an optimum scan exposure time by the scanning device on the basis of one of the RGB channels and adjusting the other two channels on the basis of the optimum scan exposure time to obtain an experimental parameter, wherein the scanning device obtains image of the three channels based on the experimental parameter and analyzes best of the RGB channels, and further stores image obtained by scanning the film based on the best channel; or if the film is judged as the black/white negative film, the scanning device sets the boundary marking threshold based on the best channel of the three RGB channels, and performs automatic marking on the film based on the boundary marking threshold.

The abovementioned scanning method further includes: scanning the black/white negative film with a monochromatic light source or a RGB light source by the scanning device to obtain data of the film.

The film scanning method is adapted to a multi-function scanning device or a multi-function film scanning device for obtaining the base background color value of a film, that is, the RGB averages, according to the determination of scanning the film base in a positive film mode to determine whether the film type belongs to one of the positive film, the black/white negative film and the color negative film. The scanning device automatically confirms the subsequent scanning program according to the film type. As for scanning of the negative film, a preferred scan exposure time is related to a specific range of the base background color value of the film so that accurate scanning of each film is implemented. The scanning device automatically performs accurate adjustment on the scan exposure time according to the type and the base color of the film, and performs automatic marking on the scanned film according to the set boundary marking threshold, so as to obtain a scanned result with reasonable exposure and hues and so as to confirm the scan boundary.

Since elements of the scanner are getting more and more simplified, portable scanners and multi-function scanners are rarely equipped with larger storage capacity or numerous operation buttons. To assure the scan speed, embodiments of the invention gather the histogram statistics of each scan result (that is, the linear scan data is obtained when the scanning module completes one scanning), and further accumulates the statistical data to obtain the histogram data of the whole scan image.

The judge/confirmation of the film type is the basis for film scanning and automatic marking. However, there are differences in the film type and the base color of the films manufactured by different manufacturers or the films with different types or specifications. Through the statistical analysis on the base color of the film of each type of the film under the positive film mode, it is found that the individual RGB averages of the base of the film are different for each type of positive films and negative films (the black/white negative film and the color negative film); but the individual RGB average is still within a certain range for the above three film types respectively. Thus, the film type could be accurately judged according to the statistics of the individual RGB average of the base of the film.

During scanning, the scanning device effectively expands the dynamic range and reduces noise impacts by automatically adjusting the exposure time for the negative film. Based on the individual RGB averages of the base and the exposure time, the scanning device calculates the optimum exposure time under the negative film mode for which the individual RGB averages are optimum, so as to confirm/set the boundary marking threshold. As for the black/white negative film, one of the RGB color values is confirmed according to the above mode, and on the basis of the confirmed optimum exposure time, other two color values are adjusted, and the optimum color value parameter is selected.

The principles of setting the boundary marking threshold are disclosed below. When recognizing the film type, the scanning device also confirms the individual RGB averages of the base of the film under the current exposure conditions. There are differences between the individual RGB averages in the base and the individual RGB averages in the film picture region. Through the threshold analysis on the individual RGB averages in different regions, the marking area of the film picture region is confirmed, and the automatic marking on the film picture region is implemented.

The film scanning method determines the film type and confirms scan exposure time according to the base background color value of the film, so that after the film passes through the scanning device at one time, the scanning device scans the film accurately at high speed. Thus, the disadvantage of the current scanning device, that is, the scanning device has to repeatedly scan the film during film scanning, is resolved.

Embodiments of the invention have the following benefits: the film scanning method automatically completes the recognition of film type and performs accurate scanning based on the scan exposure time, expands the dynamic range, and reduces noise impacts so as to obtain a scan image with higher accuracy.

The invention will become apparent from the following detailed description of the preferred but non-limiting embodiments. The following description is made with reference to the accompanying drawings.

DETAILED DESCRIPTION OF THE INVENTION

The film scanning method is adapted to a scanner with film scanning function and completes automatic recognition and scan correction for each film type.

Figure 1:
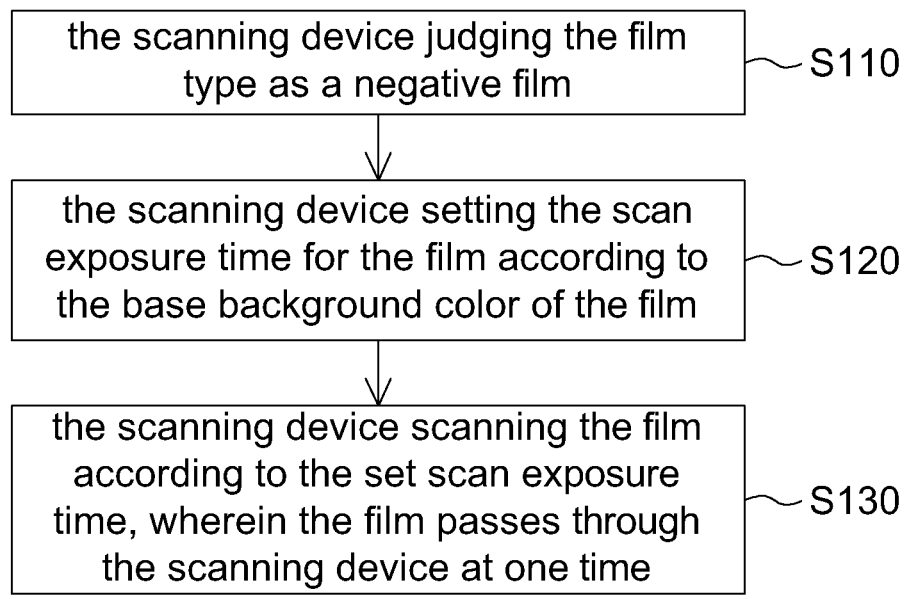
FIG. 1 shows a flow chart according to an embodiment of the invention.

As indicated in FIG. 1, in an embodiment, the procedures of the film scanning method are disclosed below.

S110: the scanning device judges the film type as a negative film.

The film could be categorized into three types, namely, the positive film, the black/white negative film and the color negative film, wherein the base background color for each type film has large variance, so that the film type could be automatically judged by the scanning device according to the base background color of the film.

S120: the scanning device sets the scan exposure time for the film according to the base background color of the film.

S130: the scanning device scans the film according to the set scan exposure time, wherein the film passes through the scanning device at one time.

Thus, the film scanning method sets the optimum scan exposure time according to the base background color of the film, expands the dynamic range, and reduces noise impacts so as to obtain the optimum scanning result of the film. The optimum scan exposure time, by which the optimum scanning result of the film is obtained after scanning, is different for different base background colors. The method according to the embodiment of the invention sets the optimum scan exposure time through the recognition of the base background color of the film, and further assures the accuracy in subsequent scanning.

Figure 2:
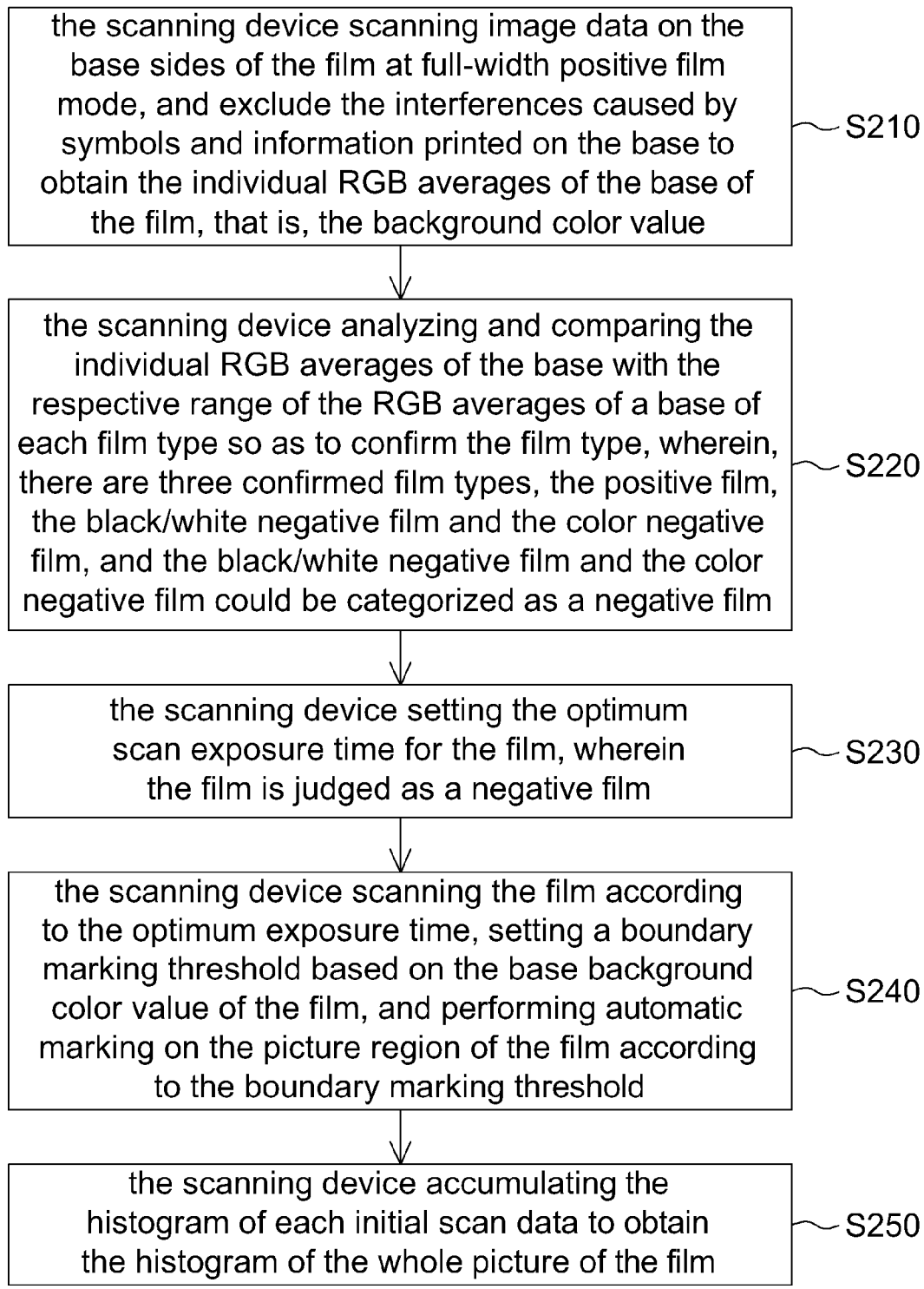
FIG. 2 shows a flow chart according to another embodiment of the invention.

In another embodiment as indicated in FIG. 2, the film scanning method includes the following steps. At step S210, the scanning device is activated for scanning image data on two base sides of the film in a full-width positive film mode. Since the two sides of the film carry data information such as manufacturer information and film type, impacts on the film base caused by symbols and information printed thereon are excluded first, so as to obtain the individual RGB average value (that is, the background color) of the base of the film.

Next, at step S220, the individual RGB average value of the base of the film, obtained by the scanning device through analysis, is compared with the RGB average range of the base of each film type so as to judge the film type, wherein there are three film types, namely, the positive film, the black/white negative film and the color negative film; and the black/white negative film and the color negative film could be categorized as a negative film.

Since the positive film will not be affected by the scan exposure time, the subsequent step S230 could be applied to the black/white negative film and the color negative film. In step S230, the scanning device set the optimum exposure time for the film which is judged as a negative film.

At step S240, the scanning device scans the film according to the set optimum exposure time, sets a boundary marking threshold based on the base background color of the film, and performs automatic marking on the picture region of the film according to the boundary marking threshold. The boundary marking threshold is a demarcation value for separating foreground regions from background regions during scanning, that is, the demarcation value separating the base region from the film picture region. Since the film picture region is usually determined as a regular rim, the boundary of the regular rim could be confirmed through the comparison of the boundary color value of the scan data.

At step S250, the scanning device accumulates the histogram of each initial scan data to obtain the histogram of the whole picture of the film, so that a scanning result with superior and higher accuracy is obtained after the film passes through the scanning device at one time.

Figure 3:
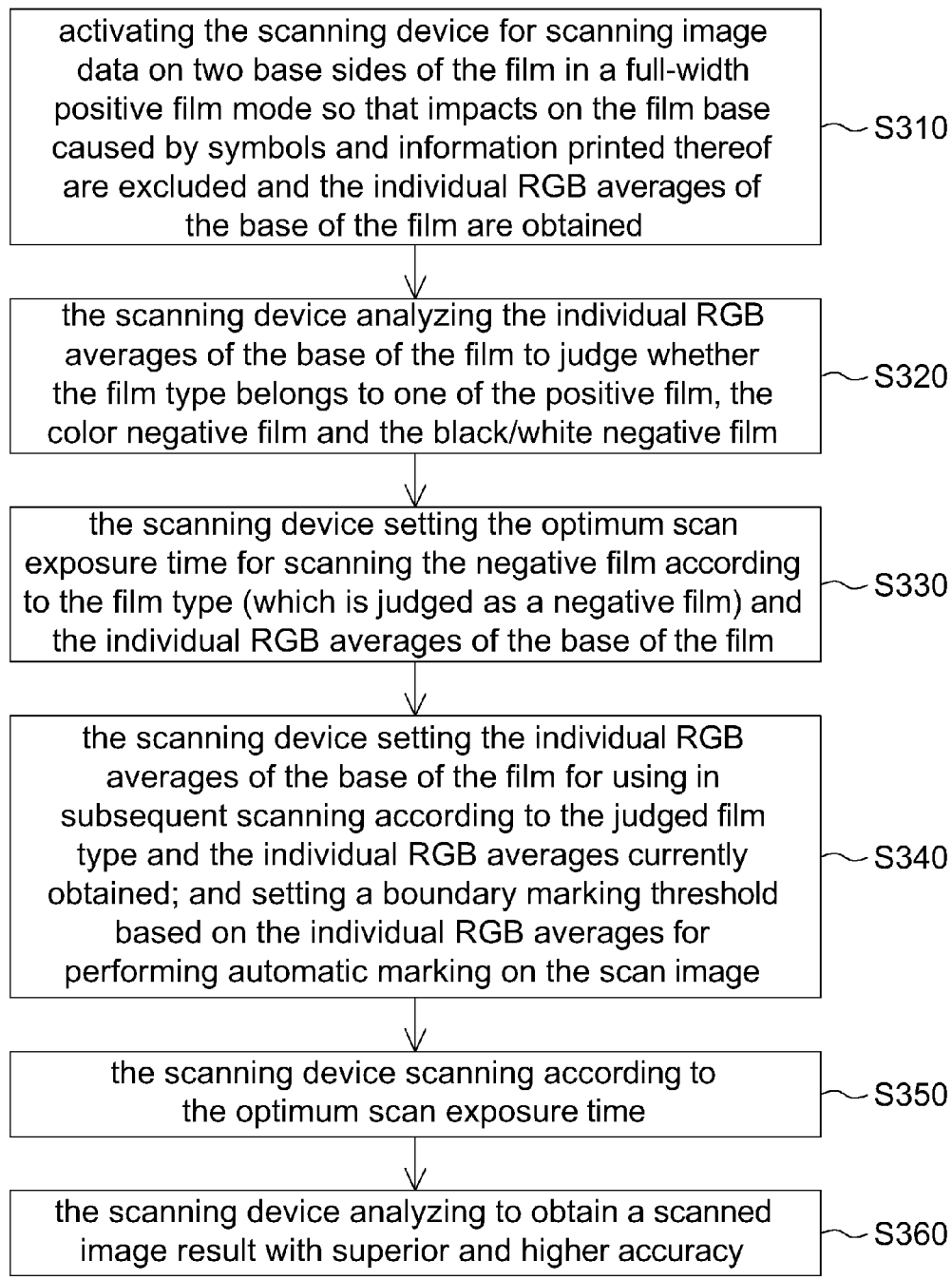
FIG. 3 shows a flow chart according to yet another embodiment of the invention.

In yet another embodiment as indicated in FIG. 3, the procedures of the film scanning method are disclosed below.

At step S310, the scanner is activated for scanning image data on two base sides of the film in a full-width positive film mode so that impacts on the film base caused by symbols and information printed thereof are excluded. By so, the individual RGB averages of the base of the film are obtained. Next, at step S320, the scanning device analyzes the individual RGB averages of the base of the film to judge whether the film type belongs to one of the positive film, the color negative film and the black/white negative film. Then, at step S330, the scanning device sets the optimum scan exposure time for scanning the negative film according to the film type (which is judged as a negative film) and the individual RGB averages of the base of the film. After that, at step S340, the scanning device sets the individual RGB averages of the base of the film for using in subsequent scanning according to the judged film type and the individual RGB averages currently obtained; and sets a boundary marking threshold based on the individual RGB averages for performing automatic marking on the scan image. The method could adopt an alternative step S340 as follows: the scanning device scans the base for the optimum scan exposure time to obtain the individual RGB averages of the base of the film and sets a boundary marking threshold based on the individual RGB averages for performing automatic marking on the scan image. Afterwards, at step S350, the scanning device performs scanning according to the optimum scan exposure time. Lastly, as indicated in step S360, the scanning device analyzes to obtain a scanned image result with superior and higher accuracy. In practice, when the scanning device judges that the film type is a black/white negative film, the scanning device sets the optimum scan exposure time on the basis of one of the average RGB color values, adjusts other two average RGB color values on the basis of the optimum scan exposure time (which is set based on the one of the average RGB color values) to select and obtain the optimum color value parameter. Or, when the film type is a black/white negative film, the scanning device sets the boundary marking threshold based on best of the three RGB channels; and performs automatic marking on a scan image through the boundary marking threshold.

As for scanning the black/white negative film, the scanning device could adopt a monochromatic light source for scanning the black/white negative film or adopt a RGB light source for scanning the black/white negative film.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A film scanning method, comprising:
   setting a scan exposure time for a film by a scanning device according to a base background color of the film if the film is judged as a negative film by the scanning device; and
   scanning the negative film during the scan exposure time;
   wherein the film passes through the scanning device at one time so that the scanning device judges and scans the film;
   individual RGB averages of a base of the film is set as the base background color of the film; and
   a subsequent scan exposure time is set by the scanning device according to a judgment on a type of the film and the individual RGB averages of the base of the film under a current exposure condition so as to calculate the individual RGB averages of the base of the film for subsequent scanning and set the individual RGB averages of the base of the film for subsequent scanning as a boundary marking threshold for automatic marking.

2. The film scanning method according to claim 1, further comprising:
   scanning the film entering into the scanning device by the scanning device so as to obtain the individual RGB averages of the base of the film, wherein the scanning device judges the film according to the individual RGB averages of the base of the film.

3. The film scanning method according to claim 2, further comprising:
   judging the type of the film as one of a positive film, a black/white negative film and a color negative film by the scanning device according to the individual RGB averages of the base of the film.

4. The film scanning method according to claim 1, further comprising:
   after the film is inserted into the scanning device, activating the scanning device in a positive film mode for analyzing image data on two base sides of the film to obtain the base background color of the film so as to judge the film.

5. The film scanning method according to claim 1,
   wherein the boundary marking threshold is a demarcation value separating a foreground point from a background point during scanning.

6. A film scanning method, comprising:
   after a film entering into a scanning device, reading image data of a base of the film by the scanning device to obtain individual RGB averages of the base of the film, wherein the individual RGB averages of the base of the film is set as a base background color of the film;
   judging a type of the film as one of a positive film, a black/white negative film and a color negative film by the scanning device according to the individual RGB averages of the base of the film;
   setting a subsequent scan exposure time by the scanning device according to a judgment on the type of the film and the individual RGB averages of the base of the film under a current exposure condition so as to calculate the individual RGB averages of the base of the film for subsequent scanning and set the individual RGB averages of the base of the film for subsequent scanning as a boundary marking threshold for automatic marking; and
   scanning the film by the scanning device under the above conditions to obtain scanned data of the film.

7. The film scanning method according to claim 6, wherein the step of setting the subsequent scan exposure time comprises:
   setting the individual RGB averages of a base of another negative film for subsequent scanning in advance and comparing with the individual RGB averages of the type-judged film by a predetermined scan exposure time so as to calculate the subsequent scan exposure time for the film.

8. The film scanning method according to claim 6, wherein after the film enters into the scanning device, the film passes through the scanning device at one time for completing the judge of the film type, the film scanning and automatic marking program so as to obtain image data of the scanned film.

9. The film scanning method according to claim 6, further comprising:
   if the film is judged as the black/white negative film, setting a predetermined scan exposure time by the scanning device on the basis of one of RGB channels and adjusting the other two channels on the basis of the predetermined scan exposure time to obtain an experimental parameter, wherein the scanning device obtains image of the RGB channels based on the experimental parameter and analyzes the RGB channels, and further stores image obtained by scanning the film based on one of the RGB channels.

10. The film scanning method according to claim 9, further comprising:
   scanning the black/white negative film with a monochromatic light source or a RGB light source by the scanning device to obtain data of the film.

\* \* \* \* \*